(12) United States Patent  
Bourgault et al.

(10) Patent No.: US 7,159,523 B2  
(45) Date of Patent: Jan. 9, 2007

(54) METHOD AND APPARATUS OF AGRICULTURAL FIELD SEEDING

(75) Inventors: Gerard Bourgault, St. Brieux (CA); Mark Cresswell, St. Brieux (CA)

(73) Assignee: Bourgault Industries Ltd., Saskatchewan (CA)

( * ) Notice: Subject to any disclaimer, the term of this patent is extended or adjusted under 35 U.S.C. 154(b) by 0 days.

(21) Appl. No.: 11/336,183

(22) Filed: Jan. 20, 2006

(65) Prior Publication Data

US 2006/0162632 A1    Jul. 27, 2006

(30) Foreign Application Priority Data

Jan. 24, 2005    (CA) .................................... 2493898

(51) Int. Cl.  
*A01C 7/00* (2006.01)  
*A01C 9/00* (2006.01)

(52) U.S. Cl. ...................................... 111/187; 111/188

(58) Field of Classification Search ................. 111/79, 111/80, 186–188, 194, 195  
See application file for complete search history.

(56) References Cited

U.S. PATENT DOCUMENTS

| 5,331,907 | A | 7/1994 | Beaujot |
| 5,396,851 | A | 3/1995 | Beaujot |
| 6,142,085 | A | 11/2000 | Drever et al. |
| 6,216,616 | B1 | 4/2001 | Bourgault |
| 6,332,412 | B1 | 12/2001 | Swab et al. |
| 6,640,731 | B1 | 11/2003 | Rowlatt et al. |

*Primary Examiner*—Christopher J. Novosad  
(74) *Attorney, Agent, or Firm*—Frost Brown Todd LLC

(57) ABSTRACT

A seeding and fertilizing apparatus comprises a plurality of seed assemblies each comprising a trailing arm pivotally connected at a front end thereof to the frame and a packer wheel rotatably attached to rear end thereof. A seed knife is attached to the trailing arm ahead of the packer wheel which rolls along the seed furrow created by the knife. A vertical position of the knife with respect to the packer wheel is adjustable, and a bias device is operative to exert a downward bias force on the trailing arm. A plurality of fertilizer assemblies each comprises a fertilizer disc rotatably mounted to the frame such that a vertical position of the disc with respect to the implement frame is adjustable. The seed assemblies and fertilizer assemblies are oriented laterally such that each fertilizer furrow is located between adjacent seed furrows.

18 Claims, 9 Drawing Sheets

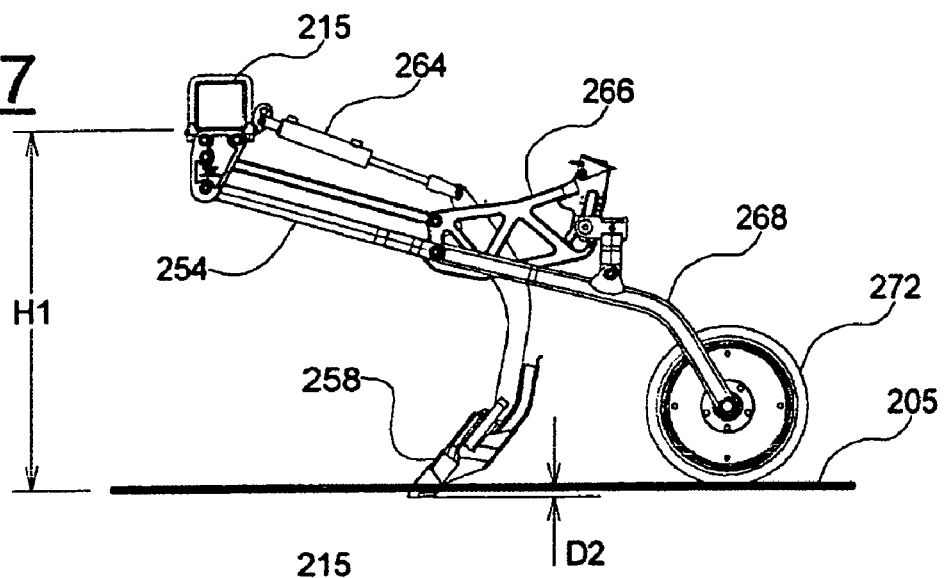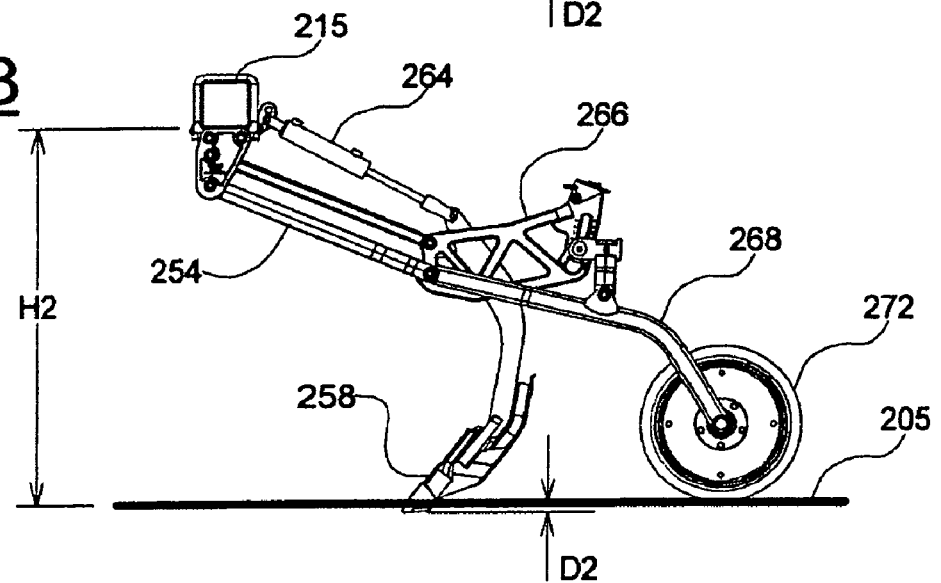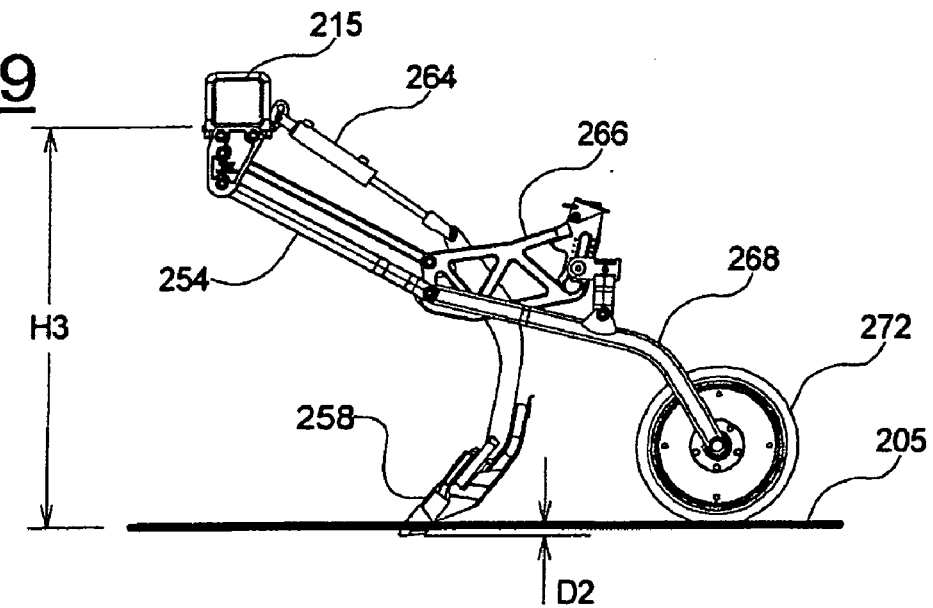

METHOD AND APPARATUS OF AGRICULTURAL FIELD SEEDING

This invention relates to agricultural implements and more specifically to a seeding apparatus for one pass seeding and fertilizing.

BACKGROUND OF THE INVENTION

Over the years, global competitiveness in agricultural grains markets and economic pressures on individual grain producers have driven farmers to utilize seeding equipment that provides the greatest possible economy of purchase, operation and maintenance. Equally, farmers have sought equipment that optimizes the potential for crop yields by providing accurate seeding depth, optimizing seed/soil contact, preserving soil moisture, and minimizing soil disturbance which promotes weed growth.

Seeding machines have been developed that allow the placement of seed in a field with minimum tilling or even no tilling. In addition to developing machines that allow seeding alone, a lot of effort and development has gone into developing machines that allow the placement of fertilizer in the soil at the same time the seeding is being done. These machines allow a field to be seeded and fertilized in a single pass.

The machines that have been developed to both seed and provide fertilizer in a single pass are typically modified air seeders. These modified air seeders typically comprise two or more holding tanks, for holding particulate matter, connected to a wheeled frame assembly. Various means for delivering the particulate materials in separate streams to various sub-assemblies for dispensing of the particulate material are used. These prior art machines have taken two distinct routes in their methods of providing both seed and fertilizer in a single pass. The first route is the use of "double shooting" machines. These machines operate by opening a series of furrows in the soil in the field and placing both seed and fertilizer in each furrow. Typically, these configurations are intended to place the seed and the fertilizer in different locations within essentially the same furrow, or in separate furrows that are not much more than one inch apart. Typical arrangements for these types of "double shooting" include systems with a single opener and separate seed and fertilizer ports (such as those systems disclosed in U.S. Pat. No. 6,640,731 to Rowlett et al., and U.S. Pat. No. 6,332,412 to Swab et al.) and systems with a leading fertilizer coulter or hoe followed by a trailing seed coulter or hoe that places the seed and fertilizer in very nearly the same line (such as the system disclosed in U.S. Pat. No. 5,396,851 to Beaujot, U.S. Pat. No. 5,331,907 to Beaujot and U.S. Pat. No. 6,142,085 to Drever et al.

These types of "double shooting" methods all place the fertilizer in relatively close proximity to the seeds. The use of fertilizer at the time of seeding can be greatly beneficial to the seedling emergence and eventual crop yield. Properly fertilizing at the time of seeding can improve the yield of a crop. However, fertilizer that is placed too near the seed can damage the seed and cause delay and reductions in emergence of the crop and can even cause a reduction in the quality and yield of a crop, particularly with more sensitive seeds, in particular soil types and in dry soil conditions. Even if placing the fertilizer too close to the seed only causes delays in the crop maturing, an early frost before the crop has been harvested can have disastrous consequences to the crop. The openers of these units, while mounted on the same "shank", are staggered somewhat, in an attempt to provide seed & fertilizer rows that are typically spaced about one inch apart. The drawback of these types of assemblies is that in certain soil & moisture conditions, for example drier clay soils that tend to lump, it is very difficult to achieve separation of seed and fertilizer when the seed and fertilizer rows are in such close proximity. Often, some of the seed falls into the fertilizer furrow.

The second route these prior art machines have taken for dispensing seed and fertilizer in a single pass are through "mid-row banding openers". These types of machines are also modified air seeder type machines and comprise two types of sub-assemblies attached to the frame: fertilizer assemblies and seed assemblies. This type of system is disclosed in U.S. Pat. No. 6,216,616 to Bourgault. The Bourgault system uses coulter disc type fertilizer assemblies that create furrows mid way between adjacent pairs of furrows opened by coulter disc type seed assemblies. However, this system uses the same type of assemblies for depositing both seed and fertilizer and does not allow independent adjustment of the seed placement openers nor does it allow independent depth control of each seed assembly during operation.

SUMMARY OF THE INVENTION

It is an object of the present invention to provide a seeding apparatus that overcomes problems in the prior art.

In a first embodiment the invention provides a seeding and fertilizing apparatus comprising an implement frame mounted on wheels for travel over the ground in an operating travel direction. A plurality of seed assemblies is attached to the implement frame, each seed assembly comprising: a trailing arm pivotally connected at a front end thereof to the frame about a substantially horizontal front arm axis oriented substantially perpendicular to the operating travel direction; a seed knife attached to the trailing arm and operative to create a seed furrow when a bottom end thereof is engaged in the ground; a packer wheel rotatably attached rearward of the seed knife and oriented to roll substantially along the seed furrow. A vertical position of the seed knife with respect to the packer wheel is adjustable to vary a depth of the seed furrow and a bias device is operative to exert a downward bias force on the trailing arm. A plurality of fertilizer assemblies each comprises a fertilizer disc rotatably mounted to the fertilizer assembly wherein a vertical operating position of the fertilizer disc with respect to the implement frame is adjustable, and the fertilizer disc is operative to create a fertilizer furrow when engaged in the ground. The fertilizer discs and seed knives are movable from a transport position above the ground to a lowered operating position wherein the fertilizer discs and seed knives are engaged in the ground. The seed assemblies and fertilizer assemblies are oriented laterally on the implement frame such that in operation each fertilizer furrow is located between adjacent seed furrows.

In a second embodiment the invention provides a method of seeding and fertilizing a field comprising providing an implement frame mounted on wheels for travel over the ground in an operating travel direction; attaching a plurality of seed assemblies to the implement frame, each seed assembly comprising a trailing arm pivotally connected at a front end thereof to the frame about a substantially horizontal front arm axis oriented substantially perpendicular to the operating travel direction; a packer wheel rotatably attached to rear end of the trailing arm; a seed knife attached to the trailing arm ahead of the packer wheel and operative to create a seed furrow when a bottom end thereof is engaged in the ground, the knife oriented such that the packer wheel rolls substantially along the seed furrow; and a bias device operative to exert a downward bias force on the trailing arm when the trailing arm is in the operating position. A vertical position of the seed knife is adjusted to a desired position with respect to the packer wheel. A plurality of fertilizer assemblies is mounted to the frame, each fertilizer assembly comprising a fertilizer disc rotatably mounted to the fertilizer assembly, the fertilizer disc operative to create a fertilizer furrow when engaged in the ground. The seed assemblies and fertilizer assemblies are oriented laterally on the implement frame such that in operation each fertilizer furrow is located between adjacent seed furrows. The seed knives and fertilizer discs are moved down from a transport position above the ground to a lowered operating position wherein the fertilizer discs and seed knives are engaged in the ground, and the implement frame is moved across the field in the operating travel direction and fertilizer is deposited into the fertilizer furrows and seed is deposited into the seed furrows ahead of the packer wheel.

According to the present invention there is provided a number of fertilizer placement openers and a plurality of seed placement openers that attach to a frame of a planting apparatus. The planting apparatus can be used in one pass seeding to place both seed and fertilizer in a field in a single pass. The seed placement openers are positioned so that furrows created by the seed placement openers are parallel at substantially regular intervals. The fertilizer placement openers are positioned on the frame such that furrows created by the fertilizer placement openers are positioned substantially mid-way between adjacent pairs of seed furrows created by the seed placement openers.

Fertilizer placement openers are adjustably connected to the frame of the planting apparatus and comprise a disc oriented at an acute angle to the direction of travel of the planting apparatus to create a furrow in a ground surface the planting apparatus is traveling across. Fertilizer is provided by the planting apparatus to a fertilizer feed located in proximity to the disc to dispense fertilizer into the furrow opened by the disc. The fertilizer is typically, supplied from holding tanks on the planting apparatus to the fertilizer feed through the use of tubes or conduits and can be a liquid type of fertilizer or a granular type of fertilizer.

Seed placement openers are adjustably connected to the frame of the packer apparatus and comprise a seed dispensing knife that creates a furrow in a ground surface the planting apparatus is traveling across, and a packer wheel. Through the adjustment of the height of packer wheel in relation to the seed dispensing knife, the depth the seed dispensing knife penetrates the ground surface can be adjusted. Because the packer wheel sets the depth the seed dispensing knife penetrates the ground surface, this depth of penetration is largely independent from the vertical height of the frame of the planting apparatus and variations in the vertical height of the frame when the planting apparatus is moving over an uneven ground surface. The depth of seed placement in each row remains consistent where the packer wheel which controls the operating depth of the seed dispensing knife is located in close proximity to the seed dispensing knife.

Seed is typically provided from a holding tank on the planting apparatus through a tube or conduit to the seed dispensing knife to be placed in the furrow created by the seed dispensing knife.

The invention allows for the individual adjustment of the depth of each furrow created by either a fertilizer placement opener or a seed placement opener, allowing an operator of the planting apparatus to tailor a one pass seeding and initial fertilizing of a field to the exact conditions of the field, type of crop that will be seeded.

A parallel linkage trailing arm can conveniently provide improved consistency of seed furrow depth.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIGS. 7–9 are schematic side views showing the how the seed furrow depth remains substantially constant as the parallel link trailing arm moves up and down;

DETAILED DESCRIPTION OF THE ILLUSTRATED EMBODIMENTS

Figure 1:
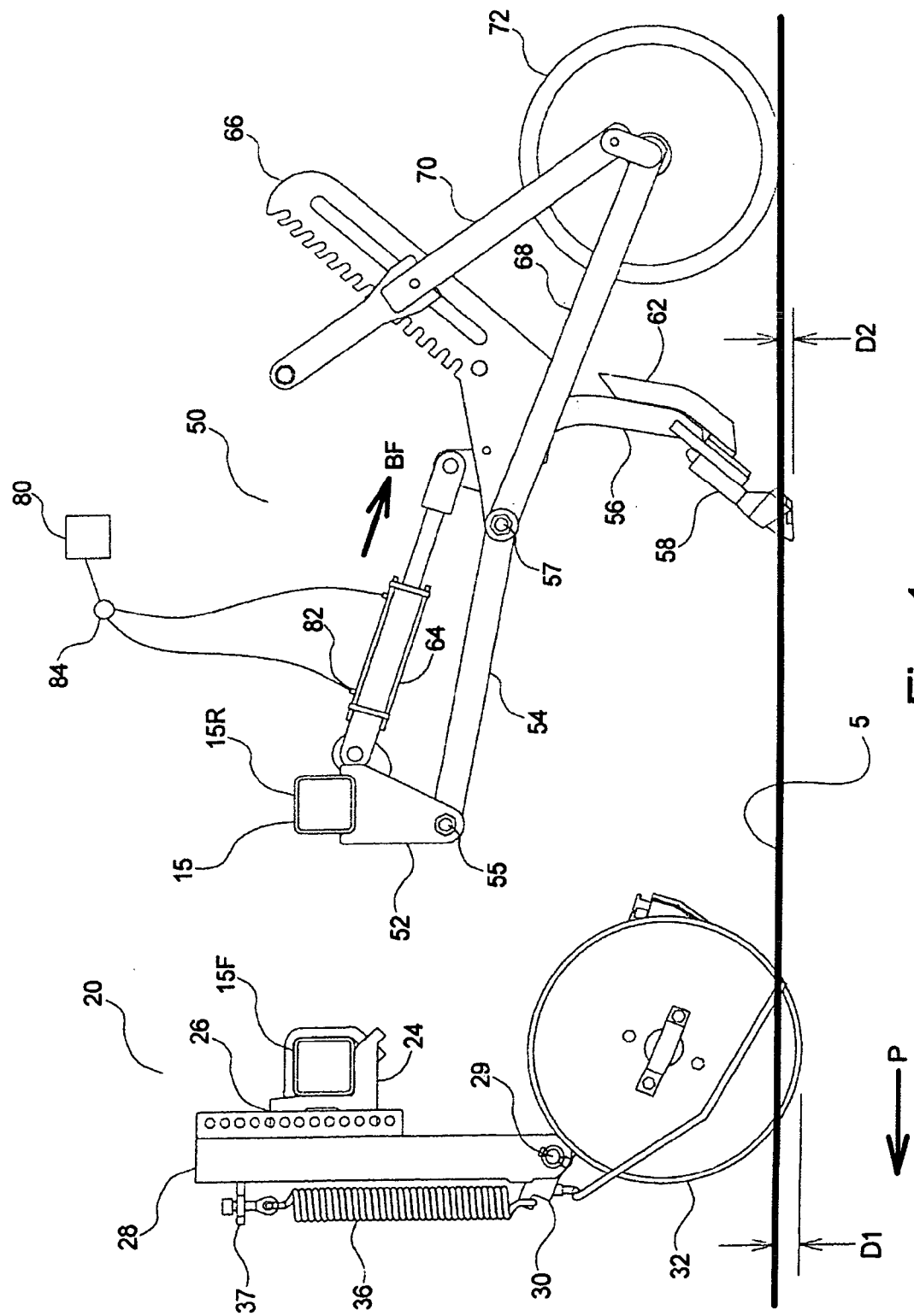
FIG. 1 is a schematic side view of an embodiment of the present invention showing a fertilizer assembly and a seed assembly attached to a frame.
Figure 2:
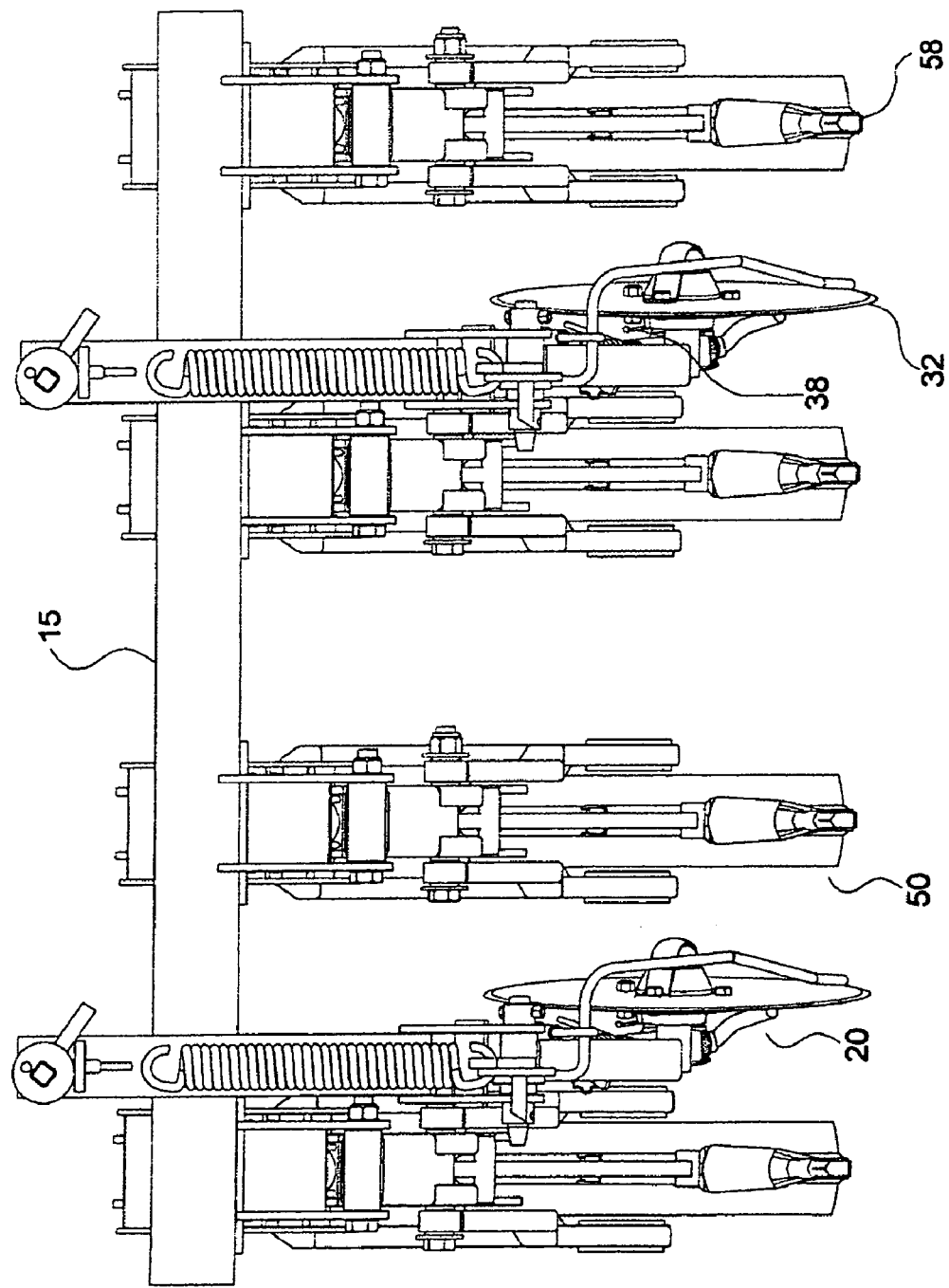
FIG. 2 is a front view of a number of the fertilizer assemblies and seed assemblies as shown in FIG. 1, attached to a section of a frame of a planting apparatus.
Figure 3:
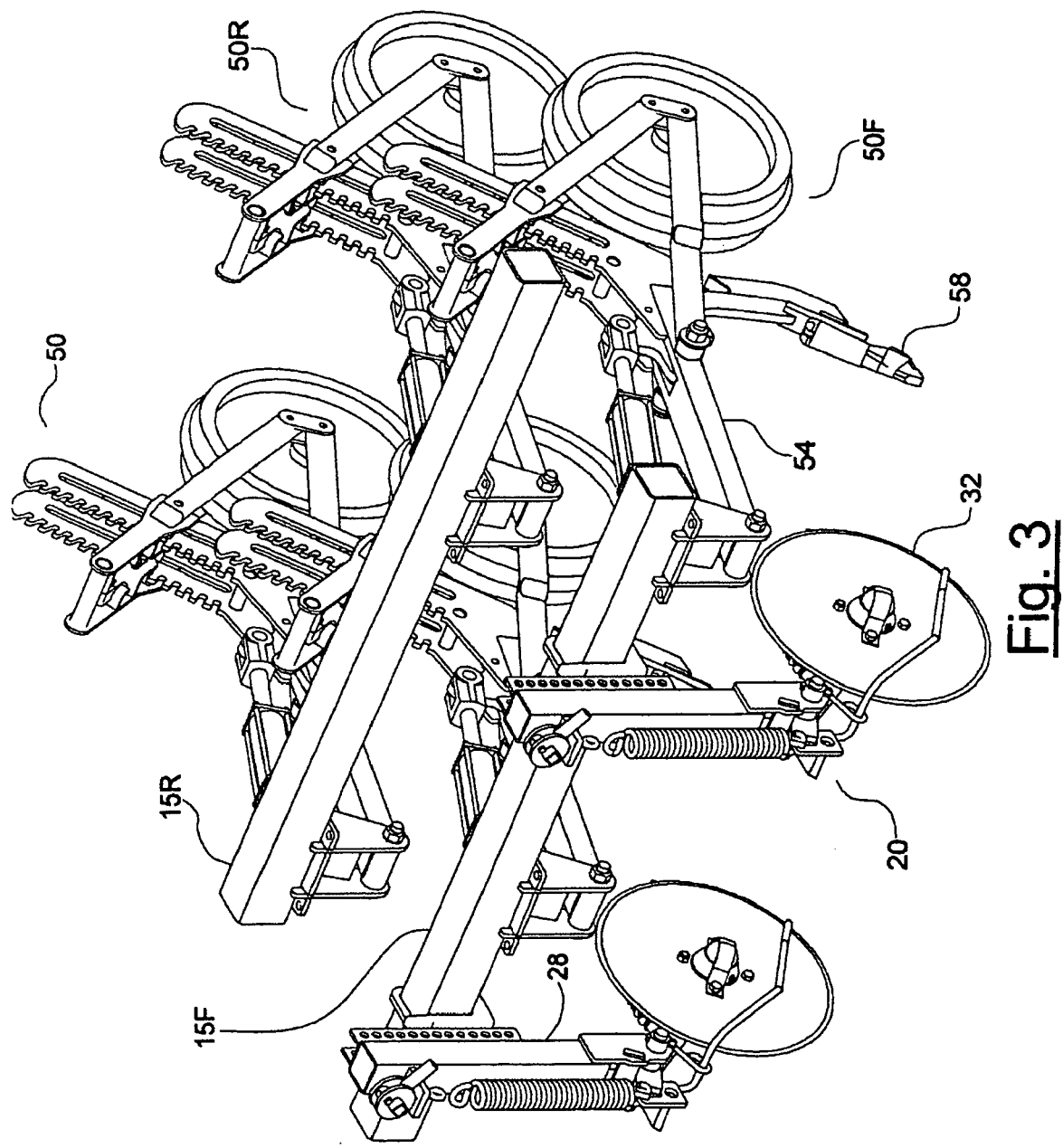
FIG. 3 is a perspective view of the fertilizer and seed assemblies as shown in FIG. 2.

FIG. 1 illustrates a side view of a fertilizer assembly 20 and a seed assembly 50, used in conjunction to seed and fertilize a field in one pass. FIGS. 2 and 3 illustrate a number of fertilizing assemblies 20 and seed assemblies 50 attached to a section of a frame 15 of a planting implement apparatus. The frame 15 is mounted to wheels for travel along the ground in an operating travel direction P.

Referring to FIGS. 1 and 2, fertilizer assembly 20 comprises a mounting bracket 24 attached to the frame 15. The mounting bracket 24 is connected to an elongate member 28 through a height adjustable connection 26. A disc bracket 30 is pivotally connected to the lower end of the elongate member 28 with a disk bracket pin 29, and a disc 32 is rotatably mounted to the disc bracket 30. As can be seen in FIG. 2, the disc 32 is oriented at an angle to the operating travel direction P. This angling of the disc 32 creates a fertilizer furrow in a ground surface 5 when the fertilizer placement opener 20 is moving in a direction of travel P.

The disc 32 is biased against the ground surface 5 by a disc biasing device 36 which is generally, but not necessarily an extension spring. One end of the disc biasing device 36 is connected to a body bracket 37 attached to the elongate member 28 and extending outward from the elongate member 28. The other end of the disc biasing device 36 is attached to an end of the disc bracket 30.

A fertilizer feed is mounted on an inside surface of disc 32. The fertilizer feed 38 receives fertilizer from a supply via a conduit or hose (not shown) and dispenses it into the fertilizer furrow opened by the disc 32.

The illustrated height adjustable connection 26 comprises a series of apertures in the elongate member 28 such that same can be moved vertically in relation to the mounting bracket 24 and fixed in place by inserting an adjustment bolt or pin into one of the apertures to fix the elongate member 28 in place in relation to the mounting bracket 24. By using the height adjustable connection 26, a depth D1 the disc 32 penetrates the ground surface 5 can be either increased or decreased. The depth D1 can also be varied by raising or lowering wheels supporting the frame 15, such that the frame and disc 32 move up or down with respect to the ground surface 5.

The seed assembly 50 comprises a mounting bracket 52 attached to the frame 15. A front end of an elongate bracing member, trailing arm 54, is pivotally attached to the frame 15 by the mounting bracket 52 using an arm pin 55 such that the trailing arm 54 can pivot about an arm axis oriented substantially horizontally and perpendicular to the operating travel direction P. The rear end of the trailing arm 54 is attached to a downward extending knife bracket 56. In the illustrated embodiment the knife bracket 56 is pivotally attached to the trailing arm 54 by bolt 57, but in other designs the trailing arm and knife bracket 56 could be formed from a single piece. Seed knife 58 is bolted to the bottom end of the knife bracket 56 and the bottom end of the seed knife 58 is configured to make a seed furrow in the ground surface 5. A seed dispensing tube 62 is mounted on the rear of the seed knife 58 and is operative to receive seed from a supply via a conduit (not shown) and dispense the seed in the seed furrow.

Rigidly attached to the rear end of the elongate trailing arm 54 is a packer adjustment bracket 66. A front end of a packer wheel arm 68 is pivotally attached to the rear end of the elongate trailing arm 54 with bolt 57. A packer wheel 72 is rotatably attached to the rear end of the packer wheel arm 68.

A packer adjustment brace 70 allows the packer wheel 72 to be adjusted substantially vertically in relation to the seed dispensing knife 58 to adjust a depth D2 the seed dispensing knife 58 penetrates the ground surface 5. A bottom end of the packer adjustment brace 70 is pivotally connected to the rear end of the packer wheel arm 68. The top end of the packer adjustment brace 70 is engaged in the packer adjustment bracket 66 and can be locked at a desired location in the bracket 66 to fix the vertical location of the knife 58 with respect to the packer wheel 72. Moving the packer wheel 72 height upwards relative to the seed dispensing knife 58 causes the seed dispensing knife 58 to penetrate further into the ground surface 5 and increase the depth D2. Moving the packer wheel 72 downward in relation to the seed dispensing knife 58 causes the seed dispensing knife 58 to penetrate shallower into the ground surface 5 and decrease depth D2.

The trailing arm 54, the seed knife 58, and the packer wheel 72 are biased against the ground surface 5 by a knife biasing device, illustrated as hydraulic cylinder 64. The hydraulic cylinder 64 is attached to the top end of the knife bracket 56.

The hydraulic cylinder 64 is connectable to an active hydraulic source operative 80. When connected to a first port 82 of the hydraulic cylinder 64, the active hydraulic source 80 is operative to maintain a substantially constant pressure in the hydraulic cylinder 64 to exert a substantially constant downward bias force BF forcing the knife bracket 56 against a stop on the on the trailing arm 54, and thus forcing the trailing arm 54, the seed knife 58, and the packer wheel 72 downward toward the ground during operation while allowing the hydraulic cylinder 64 to extend and retract in response to forces exerted on the seed knife 58 and the packer wheel 72. The active hydraulic source 80 allows the hydraulic cylinder 64 to act essentially the same as a spring, but providing a more constant bias force BF.

The illustrated embodiment also includes a valve 84 such that the active hydraulic source 80 can be connected to a second port on the hydraulic cylinder 64 to raise the trailing arm 54, seed knife 58, and the packer wheel 72 to a transport position to increase clearance between the knives 58 and packer wheels 72 and the ground.

The knife biasing device could also be provided by a spring, however the hydraulic cylinder 64 has the benefit of not only providing the required downward bias force, but also can be used to provide a knife actuator to move the trailing arm up from the illustrated operating position to a raised transport position.

In the apparatus of FIGS. 1–3 the mounting of the frame 15 to the wheels is such that the wheels can move up and down with respect to the frame 15 to raise and lower the frame with respect to the ground and thus move the fertilizer discs 32 and seed knives 58 from a transport position above the ground surface 5 to a lowered operating position where the fertilizer discs and seed knives engage the ground and create the furrows.

Referring to FIG. 1, in operation the fertilizer placement openers 20 and seed placement openers 50 move along the ground surface 5 in direction P. As the fertilizer placement opener 20 moves in the direction of P, disc 32 is biased by the disc biasing device 36 against the ground surface 5, so that the bottom of the disc 32 penetrates the ground surface 5 to a depth D1 creating a fertilizer furrow in the ground surface 5.

The disc biasing device 36 exerts a downward force sufficient to maintain the disc at a maximum downward position during normal operations, thereby maintaining the disc 32 at a substantially constant vertical position with respect to the frame 15, such that as the frame moves across a field, the depth of the fertilizer furrow D1 is maintained more less consistent, as the frame 15 will move up and down on the wheels of the implement following the ground, as is well known in the art. When the disc 32 contacts an obstruction, such as a rock or the like, the disc will move upward against the bias force of the disc biasing element 36 to clear the obstruction, and then move to the maximum down position again. Fertilizer is provided to the fertilizer feed 38 and is deposited into the fertilizer furrow created by the disc 32.

As the seed opener 50 moves along the ground surface 5 in direction P, the packer wheel 72 is pushed against the ground and the seed dispensing knife 58 penetrates the ground surface 5 to a depth D2 below the packer wheel 72 creating a furrow in the ground surface 5. Seed is provided to the seed dispensing knife 58 utilizing the seed dispensing tube 62 and the seed is deposited into the seed furrow created by the seed dispensing knife 58. Once the seed is deposited in the seed furrow and the seed placement opener 50 continues to move in the direction P, the packer 72 rolls over and packs the seed furrow.

The depth D1 the disc 32 on the fertilizer placement opener 20 penetrates the ground surface 5 can be adjusted by moving the elongate body member 28 in relation to the frame 15 using the height adjustable connection 26. The depth D2 the seed dispensing knife 58 penetrates the ground surface can be adjusted independently from the depth D1, by adjusting the height of the packer wheel 72 in relation to the seed dispensing knife 58 by moving the packer adjustment brace 70 in relation to the packer adjustment bracket 66.

In this manner, the depth D1 of the fertilizer placed in the soil by the fertilizer placement opener 20 can be adjusted independently from the depth D2 the seed is placed in the soil by the seed placement opener 50 and vice versa. Additionally, because the vertical relation between the packer wheel 72 and the seed dispensing knife 58 predominantly determines the depth D2 of the seed furrow created by the seed placement opener 50, variations in the vertical height of the frame 15 in relation to the ground surface 5 as the seed placement opener 50 moves across the ground surface 5 have a significantly reduced effect on the depth D2 of penetration of the seed dispensing knife 58.

Figure 4:
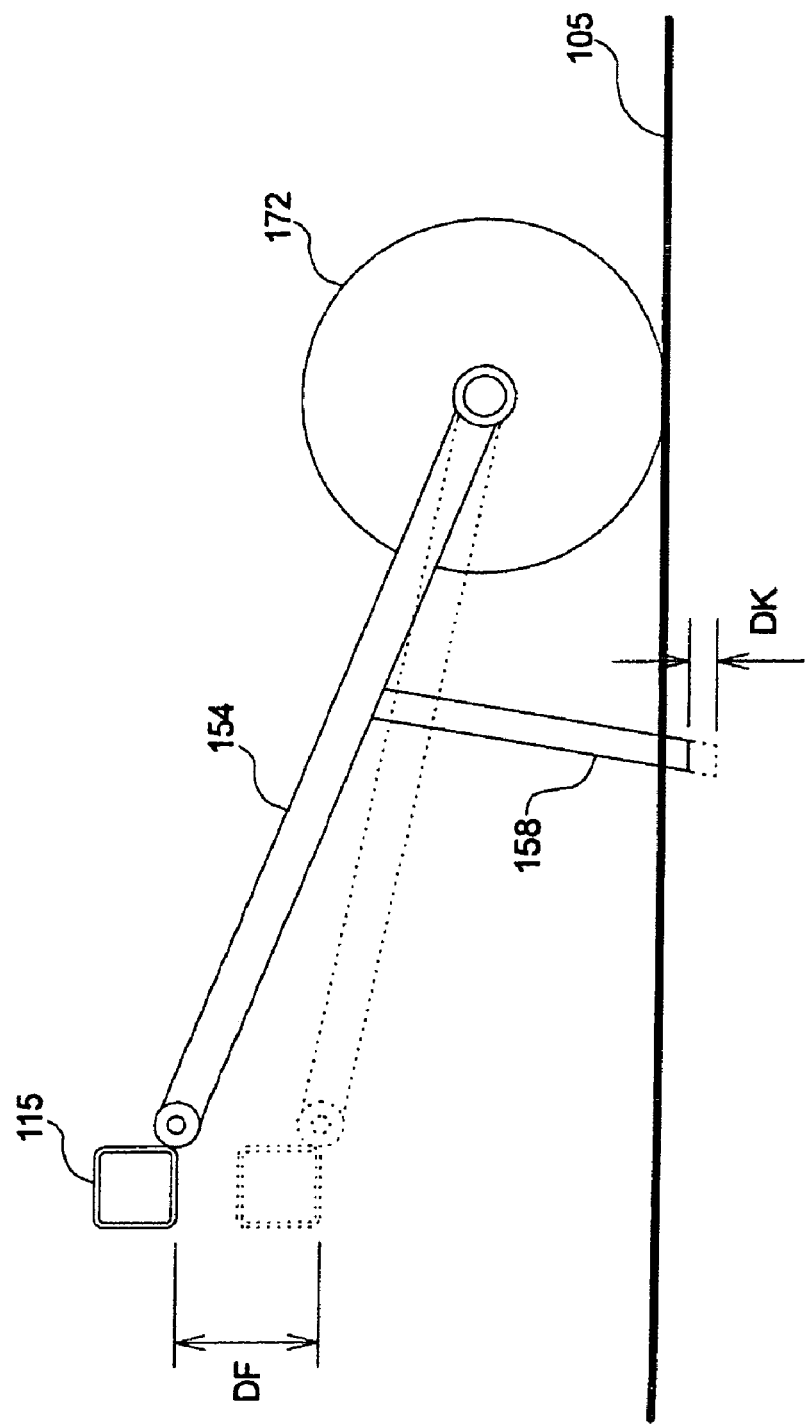
FIG. 4 schematically illustrates the movement of the seed knife with respect to the ground as the frame moves up and down with respect to the ground.
Figure 5:
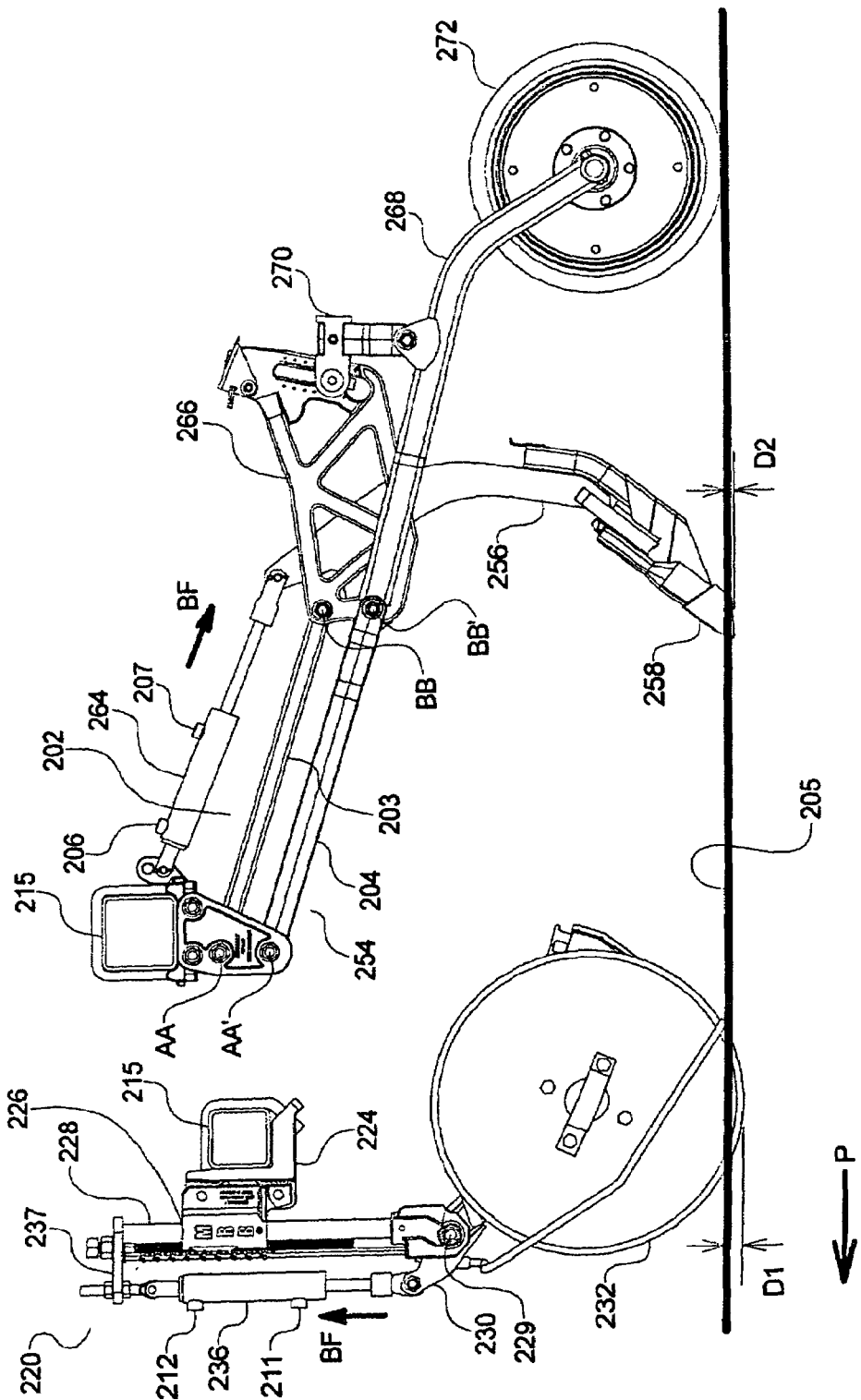
FIG. 5 is a schematic side view of an alternate embodiment of the invention showing fertilizer and seed assemblies mounted to a frame, and shown in the operating position.

FIG. 4 schematically illustrates how a variation DF in the vertical distance between the frame 115 and the ground surface 105 moves the bottom end of the knife 158 down by a much reduced distance DK. In this manner, the depth D2 of the penetration of the ground surface of the knife 158 is individually controlled by the packer wheel 172 on the end of trailing arm 154 such that variations in the distance between the ground surface 105 and the frame 115 have a much reduced effect on the depth D2 of the seed furrow allowing seeding of uneven ground at a more consistent depth.

It can also be seen from the geometry illustrated in FIG. 4 that a fertilizer disc fixed to the frame 115 will move up and down a significant distance, causing the fertilizer furrow created thereby to have a significant change in depth, with little effect on the depth of the seed furrow. Thus in addition to adjusting fertilizer furrow depth, as described above with respect to the embodiment of FIG. 1, by moving the elongate body member 28 in relation to the frame 15 using the height adjustable connection 26, the depth D1 of the fertilizer furrow can also be varied significantly by moving the frame up and down on the implement wheels, as is known in the art.

FIG. 3 illustrates a perspective view of a section of frame 15 of a planting apparatus comprising front and rear lateral frame members 15F, 15R. Fertilizer assemblies 20 and seed assemblies 50 are attached to the section of frame 15. Seed assemblies 50 are placed at substantially regular intervals along the front and rear frame members 15F, 15R so that the seed furrows created are substantially parallel at approximately regular intervals. The fertilizer assemblies 20 are spaced at regular intervals along the front frame member 15F so that the fertilizer furrows opened by the discs 32 of the fertilizer assemblies 20 are positioned substantially mid-way between adjacent pairs of seed furrows created by the seed assemblies 50.

Thus the discs 32 of the fertilizer assemblies 20 are mounted on the front frame member 15F and engage the ground along a front line substantially perpendicular to the operating travel direction and about directly under the front frame member 15F, while the first set of seed assemblies 50F are also mounted on the front frame member 15F and engage the ground along a middle line rearward of the front frame member 15F and the discs 32, generally under the rear frame member 15R, and the seed assemblies 50R mounted on the rear frame member 15R engage the ground along a rear line rearward of the rear frame member 15R. In implement design it is desirable to provide sufficient room around each ground engaging tool, such as the discs 32 and knives 58, such that the operation of one tool does not interfere with the operation of adjacent tools. Thus ground engaging tools are generally mounted on parallel lateral frame members spaced from front to back along the path of the implement, such that the ground engaging tools mounted on each lateral frame member are spaced a sufficient distance apart both forward and rearward and from side to side.

Where all ground engaging tools are mounted to an implement frame using the same mounting assembly, as is commonly the case, in order to provide three ranks of tools working along three parallel rows spaced from front to back along the path of the implement it is necessary to provide three lateral frame members.

By mounting the fertilizer discs 32 on the elongate members 28 oriented substantially vertically with respect to the frame, and mounting the seed opening knives on trailing arms 54 extending rearward, the ground engaging tools can be mounted on only two lateral frame members. A desired spacing between the front, middle and rear lines of ground engagement can be configured readily by adjusting the length of the trailing arms 54, or like modifications.

The illustrated apparatus of FIGS. 1–3 provides a fertilizer furrow between adjacent pairs of seed furrows, such that there are two seed assemblies for each fertilizer assembly. Alternatively a fertilizer assembly could be provided for each seed assembly such that the fertilizer and seed furrows alternate across the width of the implement. The apparatus can be configured such that the fertilizer furrows are midway between the seed furrows such that seed in each seed furrow draws fertilizer from both sides, or alternatively could be shifted laterally so that the fertilizer furrows are still between seed furrows, but are closer to one seed furrow such that seed in each seed furrow predominantly draws fertilizer from the fertilizer in the closest fertilizer furrow.

FIGS. 5–11 illustrate an alternate embodiment of the seeding and fertilizing apparatus of the invention. The apparatus comprises an implement frame 215 mounted on wheels for travel over the ground in an operating travel direction P. A plurality of seed assemblies 250 are attached to the implement frame 215. The seed assemblies 250 comprise a trailing arm 254 pivotally connected at a front end thereof to the frame 215 about a substantially horizontal front arm axis AA oriented substantially perpendicular to the operating travel direction P. A seed knife 258 is attached to the trailing arm 254 and is operative to create a seed furrow when a bottom end thereof is engaged in the ground. A packer wheel 272 is rotatably attached rearward of the seed knife 258 and is oriented to roll substantially along the seed furrow.

The illustrated trailing arm 254 comprises a parallel linkage 202 operative to maintain the knife 258 and packer wheel 272 at substantially constant vertical positions with respect to each other as the trailing arm moves up and down, as illustrated in FIGS. 7–9. As can be seen, the depth D2 of the seed furrow is substantially constant as the frame 215 moves up from a height H1 above the ground 205 as illustrated in FIG. 7, to the increased height H2 of FIG. 8 and to the further increased height H3 of FIG. 9. As the frame 215 moves up relative to the ground 205, the trailing arm 254 moves down, and vice versa. In field conditions this will occur due to humps and valleys in the ground surface. In contrast to the single arm 154 pivotally attached to the frame 115 in FIG. 4, the parallel linkage 202 greatly improves the consistency of the seed furrow depth D2.

By maintaining the knife 258 and packer wheel 272 at substantially constant vertical positions with respect to each other as the trailing arm 254 moves up and down following ground contours, it is possible to move the knife 258 farther forward and away from the packer wheel 272, compared to the apparatus illustrated in FIG. 4, while still maintaining consistent seed furrow depth D2. It can be seen that moving the knife 158 of FIG. 4 forward away from the packer wheel 172 will increase the already significant variations in seed furrow depth as the frame 115 moves through the height difference DF with respect to the ground surface 105.

In operation, it is desirable to allow soil moved aside by the knife 258 to fall back into the seed furrow created by the knife 258 before the packer wheel rolls over the furrow. In the apparatus of FIG. 4, where the knife 158 is very close to the packer wheel 172, operating speeds are limited because of the short distance between the knife 158 and packer wheel 172. The speed must be reduced to allow time for the soil to fall back into the seed furrow. Moving the knife 258 forward to increase the distance between the knife 258 and the packer wheel 272 allows the soil moved aside by the knife 258 more time to fall back into the seed furrow before the packer wheel 172 passes over the furrow. Operating speeds can therefore be increased compared to the apparatus of FIG. 4.

The parallel linkage 202 comprises upper and lower links 203, 204, each pivotally attached at forward ends thereof about axes AA and AA' respectively. Rear ends of the links 203, 204 are pivotally attached to the forward ends of a packer bracket 266 about axes BB and BB' respectively. The axes AA, AA', BB, and BB' are oriented such that the upper and lower links 203, 204 are parallel as they move up and down.

Packer wheel arm 268 is pivotally attached at a front end thereof to the packer bracket 266 about axis BB', and packer wheel 272 is rotatably attached to the rear end of the packer wheel arm 268. Knife bracket 256 is pivotally attached at a mid portion thereof to the packer bracket 266 and knife 258 is attached to a bottom end of the knife bracket 256. During field operations, a first port 206 of the hydraulic cylinder 264 is connected to an active hydraulic source, as described above with respect to the embodiment of FIGS. 1–3, such that the hydraulic cylinder 264 acts as a trailing arm actuator and exerts a substantially constant bias force BF on the top end of the knife bracket 256, causing same to pivot about the axis BB' and bear against a stop on the packer bracket 266 such that the bias force is transferred to the packer bracket 266 and parallel linkage 202 which are pushed downward to engage the bottom end of the knife 258 in the ground and create the seed furrow.

A packer adjustment brace 270 is attached to the packer wheel arm 268 and engages a slot in the packer bracket 266. The brace 270 is moved along the slot to set the vertical position of the seed knife 258 with respect to the packer wheel 272 at the required location to provide a desired depth D2 of the seed furrow, and then the brace 270 is locked to the packer bracket 266. The bias force BF pushes the packer wheel 272 against the ground 205.

Figure 6:
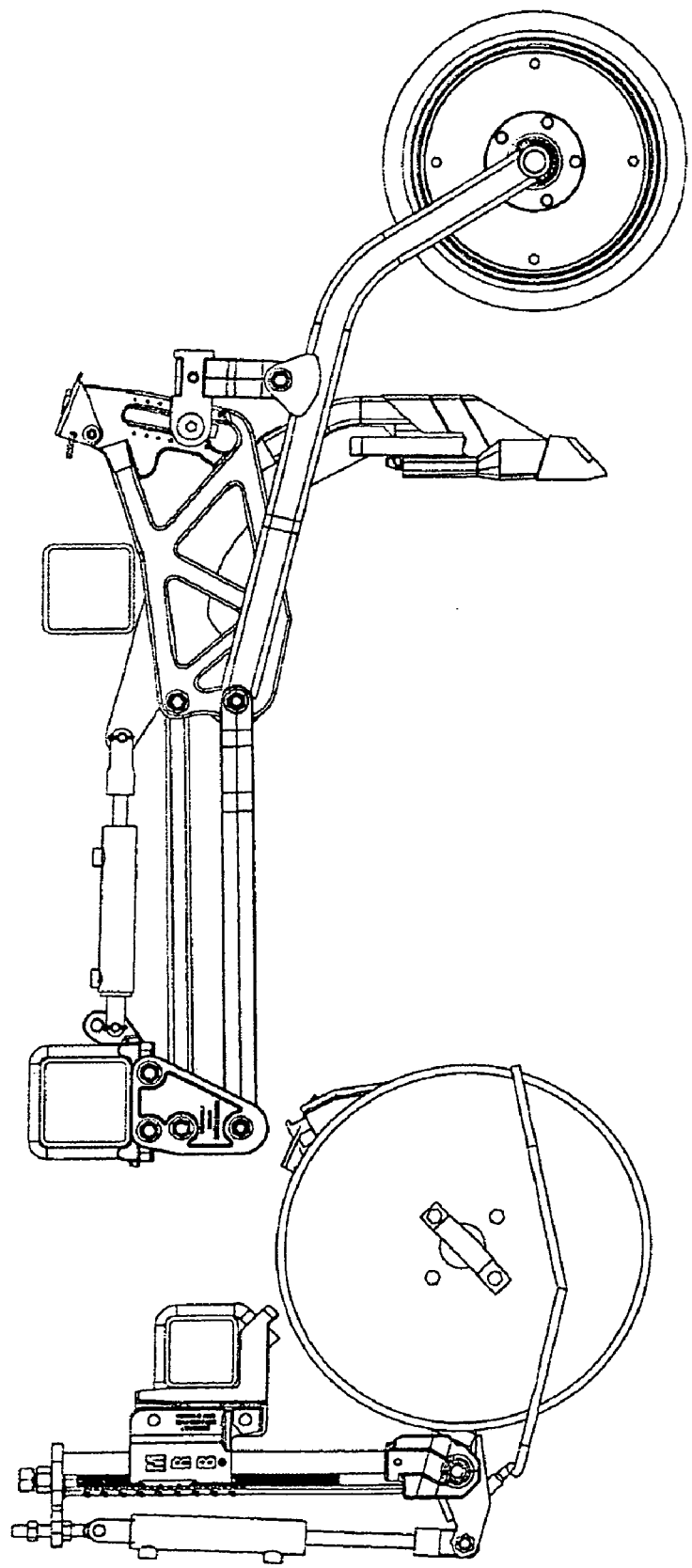
FIG. 6 is a schematic side view of the embodiment of FIG. 5 showing fertilizer and seed assemblies in the transport position.

To move the knife 258 up and out of engagement with the ground, again as described above, the active hydraulic source is connected to a second port 207 on the hydraulic cylinder 264 to retract the hydraulic cylinder 264 and pivot the top end of the knife bracket 256 toward the hydraulic cylinder 264 and cause a recess in the knife bracket 256 to bear against a pin providing the axis BB at which point further retraction of the hydraulic cylinder 264 raises the parallel linkage 202 of the lift arm 254, and the packer wheel arm 268 to the transport position illustrated in FIG. 6.

The apparatus of FIGS. 5–11 also comprises a plurality of fertilizer assemblies 220. In the illustrated embodiment each fertilizer assembly 220 comprises a mounting bracket 224 attached to the frame 215. The mounting bracket 224 is connected to an elongate member 228 through a height adjustable connection 226. By using the height adjustable connection 226, the distance between the bottom of the disc 232 and the frame 215 can be varied to set the depth D1 of the fertilizer furrow.

A disc bracket 230 is pivotally connected to the lower end of the elongate member 228 with a disk bracket pin 229, and a disc 232 is rotatably mounted to the disc bracket 230 at an angle to the operating travel direction P. The disc 232 is biased downward by a hydraulic cylinder 236. One end of the hydraulic cylinder 236 is connected to a body bracket 237 attached to the elongate member 228 and extending outward from the elongate member 228. The other end of the hydraulic cylinder 236 is attached to the end of the disc bracket 230.

The hydraulic cylinder 236 is connected to an active hydraulic source at a first port 211 thereof and exerts a downward force on the disc 232 by exerting an upward bias force BF on the front end of the disc bracket 230 forward of the disc bracket pin 229. The bias force BF is sufficient to maintain the disc 232 at a maximum downward position during normal operations, thereby maintaining the disc 232 at a substantially constant vertical position with respect to the frame 215, such that as the frame 215 moves across a field, the depth of the fertilizer furrow D1 is maintained more less consistent, as the frame 15 will move up and down on the wheels of the implement following the ground, as is well known in the art. When the disc 232 contacts an obstruction, such as a rock or the like, the disc will move upward against the bias force of the hydraulic cylinder 236 to clear the obstruction, and then move to the maximum down position again. Fertilizer is provided to the fertilizer feed as described above and is deposited into the fertilizer furrow created by the disc 232.

The apparatus of FIGS. 5–11 has a frame 215 that is fixed in vertical relationship to the wheels carrying the frame. Thus the seed knives 258 and packer wheels 272 are raised from the operating position shown in FIG. 5 to the transport position shown in FIG. 6 by the hydraulic cylinder 264, while the frame stays at a constant vertical position with respect to the ground. Similarly, the active hydraulic source is connected to a second port 212 on the hydraulic cylinder 236 to extend the hydraulic cylinder 236 and move the fertilizer discs 232 upward to the transport position of FIG. 6.

Figure 10:
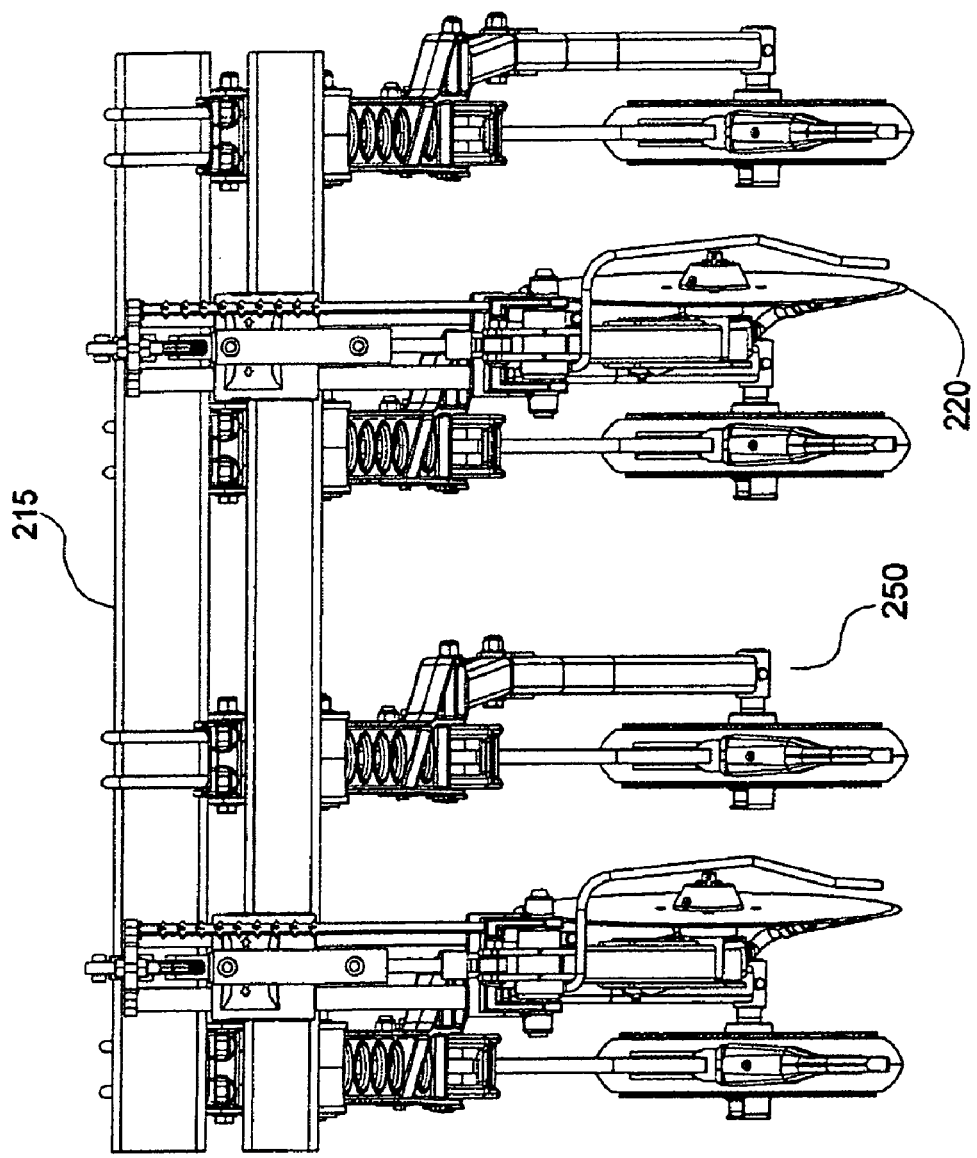
FIG. 10 is a front view of a plurality of seed and fertilizer assemblies of FIG. 5 mounted on the frame.

As illustrated in FIG. 10, the seed assemblies 250 and fertilizer assemblies 220 are oriented laterally on the implement frame 215 such that in operation each fertilizer furrow is located between adjacent pairs of seed furrows.

Figure 11:
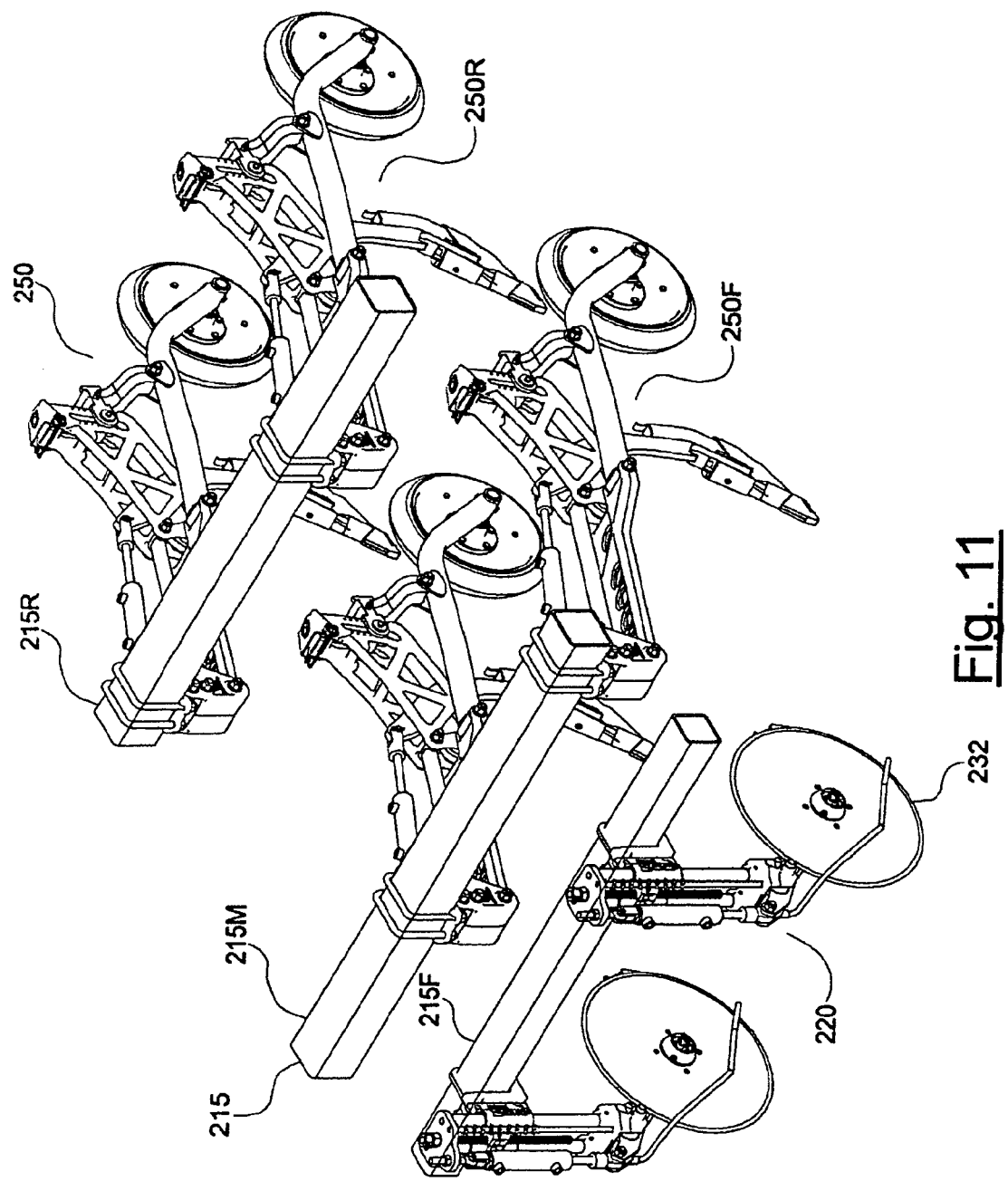
FIG. 11 is perspective view of the seed and fertilizer assemblies and frame of FIG. 10.

FIG. 11 illustrates a perspective view of a section of frame 215 of a planting apparatus comprising front, middle, and rear lateral frame members 215F, 215M, and 215R. Fertilizer assemblies 220 and seed assemblies 250 are attached to the section of frame 215. Seed assemblies 250 are placed at substantially regular intervals along the middle and rear frame members 215M, 215R so that the seed furrows created are substantially parallel at approximately regular intervals. The fertilizer assemblies 220 are spaced at regular intervals along the front frame member 215F so that the fertilizer furrows opened by the discs 232 of the fertilizer assemblies 220 are positioned substantially mid-way between adjacent pairs of seed furrows created by the seed assemblies 250.

Thus the discs 232 of the fertilizer assemblies 220 are mounted on the front frame member 215F and engage the ground along a front line substantially perpendicular to the operating travel direction and about directly under the front frame member 215F, while the first set of seed assemblies 250F are mounted on the middle frame member 215M and engage the ground along a middle line rearward of the front frame member 215F and the discs 232, generally under the rear frame member 215R, and the seed assemblies 250R mounted on the rear frame member 215R engage the ground along a rear line rearward of the rear frame member 215R. Ample spacing is thus provided for each ground engaging element, knives 258 and discs 232.

There is also disclosed a method of single pass placement of seed and fertilizer in an agricultural application using the apparatus outlined herein. The method comprises providing a number of fertilizer placement openers 20, 220 that create a fertilizer furrow in a ground surface using a disc 32, 232 and places fertilizer in the fertilizer furrow; adjusting a depth of the fertilizer furrows to a desired depth; providing a number of seed placement openers 50, 250 that create a seed furrow in a ground surface using a seed dispensing knife 58, 258 and placing seed in the seed furrow, the depth of the seed furrow determined by the adjustment of the height of a packer wheel 72, 272 in relation to the seed dispensing knife; attaching the seed placement openers 50, 250 to a frame 15, 215 of a planting apparatus such that the seed placement openers create a series of parallel seed furrows in a ground surface, the seed furrows being spaced apart at substantially regular intervals; attaching fertilizer placement openers 20, 220 to the frame of the planting apparatus such that the fertilizer placement openers create fertilizer furrows between adjacent pairs of seed furrows created by the seed placement openers; and moving the planting apparatus across the ground surface and depositing seed and fertilizer in corresponding seed and fertilizer furrows to seed and fertilize the ground surface.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A seeding and fertilizing apparatus comprising:
an implement frame comprising at least front and rear lateral frame members mounted on wheels for travel over the ground in an operating travel direction;
a plurality of seed assemblies attached to the implement frame, each seed assembly comprising:
   a trailing arm pivotally connected at a front end thereof to the frame about a substantially horizontal front arm axis oriented substantially perpendicular to the operating travel direction;
   a seed knife attached to the trailing arm and operative to create a seed furrow when a bottom end thereof is engaged in the ground;
   a packer wheel rotatably attached to the trailing arm rearward of the seed knife and oriented to roll substantially along the seed furrow;
   wherein a vertical operating position of the seed knife with respect to the packer wheel is adjustable to vary a depth of the seed furrow; and
   a bias device operative to exert a downward bias force on the trailing arm, seed knife, and packer wheel;
a plurality of fertilizer assemblies each comprising a fertilizer disc rotatably mounted to the fertilizer assembly and operative to create a fertilizer furrow when engaged in the ground;
wherein the fertilizer discs and seed knives are movable from a transport position above the ground to a lowered operating position wherein the fertilizer discs and seed knives are engaged in the ground;
wherein the seed assemblies and fertilizer assemblies are oriented laterally on the implement frame such that in operation each fertilizer furrow is located between adjacent seed furrows;
wherein the fertilizer discs are mounted to the front frame member such that same engage the ground along a front line substantially perpendicular to the operating travel direction;
wherein a first set of seed assemblies each has a trailing arm pivotally connected at a front end thereof to the front frame member such that a first set of seed knives operate along a middle line substantially perpendicular to the operating travel direction and a desired distance rearward of the front line; and
wherein a second set of seed assemblies each has a trailing arm pivotally connected at a front end thereof to the rear frame member such that a second set of seed knives operate along a rear line substantially perpendicular to the operating travel direction and a desired distance rearward of the middle line.

2. A seeding and fertilizing apparatus comprising:
an implement frame comprising at least front, middle and rear lateral frame members mounted on wheels for travel over the ground in an operating travel direction;
a plurality of seed assemblies attached to the implement frame, each seed assembly comprising:
   a trailing arm pivotally connected at a front end thereof to the frame about a substantially horizontal front arm axis oriented substantially perpendicular to the operating travel direction;
   a seed knife attached to the trailing arm and operative to create a seed furrow when a bottom end thereof is engaged in the ground;
   a packer wheel rotatably attached to the trailing arm rearward of the seed knife and oriented to roll substantially along the seed furrow;
   wherein a vertical operating position of the seed knife with respect to the packer wheel is adjustable to vary a depth of the seed furrow; and
   a bias device operative to exert a downward bias force on the trailing arm, seed knife, and packer wheel;
a plurality of fertilizer assemblies each comprising a fertilizer disc rotatably mounted to the fertilizer assembly and operative to create a fertilizer furrow when engaged in the ground;
wherein the fertilizer discs and seed knives are movable from a transport position above the ground to a lowered operating position wherein the fertilizer discs and seed knives are engaged in the ground;
wherein the seed assemblies and fertilizer assemblies are oriented laterally on the implement frame such that in operation each fertilizer furrow is located between adjacent seed furrows;
wherein the fertilizer discs are mounted to the front frame member such that same engage the ground along a front line substantially perpendicular to the operating travel direction;
wherein a first set of seed assemblies each has a trailing arm pivotally connected at a front end thereof to the middle frame member such that a first set of seed knives operate along a middle line substantially perpendicular to the operating travel direction and a desired distance rearward of the front line; and
wherein a second set of seed assemblies each has a trailing arm pivotally connected at a front end thereof to the rear frame member such that a second set of seed knives operate along a rear line substantially perpendicular to the operating travel direction and a desired distance rearward of the middle line.

3. A seeding and fertilizing apparatus comprising:
an implement frame mounted on wheels for travel over the around in an operating travel direction;
a plurality of seed assemblies attached to the implement frame, each seed assembly comprising:
   a trailing arm pivotally connected at a front end thereof to the frame about a substantially horizontal front arm axis oriented substantially perpendicular to the operating travel direction;
   a seed knife attached to the trailing arm and operative to create a seed furrow when a bottom end thereof is engaged in the around;
   a packer wheel rotatably attached to the trailing arm rearward of the seed knife and oriented to roll substantially along the seed furrow;
   wherein a vertical operating position of the seed knife with respect to the packer wheel is adjustable to vary a depth of the seed furrow; and
   a bias device operative to exert a downward bias force on the trailing arm, seed knife, and packer wheel;
a plurality of fertilizer assemblies each comprising a fertilizer disc rotatably mounted to the fertilizer assembly and operative to create a fertilizer furrow when engaged in the ground;
wherein the fertilizer discs and seed knives are movable from a transport position above the ground to a lowered operating position wherein the fertilizer discs and seed knives are engaged in the ground;
wherein the seed assemblies and fertilizer assemblies are oriented laterally on the implement frame such that in operation each fertilizer furrow is located between adjacent seed furrows;
wherein the frame is mounted to the wheels such that a vertical position of the frame with respect to the wheels can be varied to move the fertilizer discs and seed knives from the transport position down into the operating position; and
wherein at least one fertilizer disc is mounted on a bottom end of a substantially vertically oriented elongate member that is vertically adjustable with respect to the frame.

4. A seeding and fertilizing apparatus comprising:
an implement frame mounted on wheels for travel over the ground in an operating travel direction;
a plurality of seed assemblies attached to the implement frame, each seed assembly comprising:
   a trailing arm pivotally connected at a front end thereof to the frame about a substantially horizontal front arm axis oriented substantially perpendicular to the operating travel direction;
   a seed knife attached to the trailing arm and operative to create a seed furrow when a bottom end thereof is engaged in the ground;
   a packer wheel rotatably attached to the trailing arm rearward of the seed knife and oriented to roll substantially along the seed furrow;
   wherein a vertical operating position of the seed knife with respect to the packer wheel is adjustable to vary a depth of the seed furrow; and
   a bias device operative to exert a downward bias force on the trailing arm, seed knife, and packer wheel;
a plurality of fertilizer assemblies each comprising a fertilizer disc rotatably mounted to the fertilizer assembly and operative to create a fertilizer furrow when engaged in the ground;
wherein the fertilizer discs and seed knives are movable from a transport position above the around to a lowered operating position wherein the fertilizer discs and seed knives are engaged in the ground;
wherein the seed assemblies and fertilizer assemblies are oriented laterally on the implement frame such that in operation each fertilizer furrow is located between adjacent seed furrows;
wherein the frame is mounted to the wheels such that a vertical position of the frame with respect to the wheels is substantially fixed when in a field working position;
wherein at least one fertilizer assembly comprises a fertilizer disc actuator operative to move the fertilizer disc of the at least one fertilizer assembly with respect to the frame from the transport position to the operating position; and
wherein at least one seed assembly comprises a trailing arm actuator operative to move the trailing arm from a transport position downward to the operating position.

5. The apparatus of claim 4 wherein the at least one fertilizer assembly comprises a disc arm pivotally attached at a first end thereof to the frame, and wherein the fertilizer disc is rotatably attached to a rear end of the disc arm, and wherein the fertilizer disc actuator is operative to move the disc arm and attached fertilizer disc from the transport position to the operating position.

6. The apparatus of claim 4 wherein the seed knife is pivotally attached to the trailing arm by a knife bracket, and wherein the trailing arm actuator is attached to the knife bracket.

7. The apparatus of claim 4 wherein at least one bias device comprises a hydraulic cylinder.

8. The apparatus of claim 7 wherein the hydraulic cylinder is connectable to an active hydraulic source operative, when connected to a first port of the hydraulic cylinder, to maintain a substantially constant pressure in the hydraulic cylinder to exert a substantially constant downward bias force on the trailing arm when the trailing arm is in the operating position while allowing the hydraulic cylinder to extend and retract in response to forces exerted on the trailing arm, and operative, when connected to a second port of the hydraulic cylinder, to raise the trailing arm to a transport position.

9. A seeding and fertilizing apparatus comprising:
an implement frame mounted on wheels for travel over the ground in an operating travel direction;
a plurality of seed assemblies attached to the implement frame, each seed assembly comprising:
   a trailing arm pivotally connected at a front end thereof to the frame about a substantially horizontal front arm axis oriented substantially perpendicular to the operating travel direction;
   a seed knife attached to the trailing arm and operative to create a seed furrow when a bottom end thereof is engaged in the ground;
   a packer wheel rotatably attached to the trailing arm rearward of the seed knife and oriented to roll substantially along the seed furrow;
   wherein a vertical operating position of the seed knife with respect to the packer wheel is adjustable to vary a depth of the seed furrow; and
   a bias device operative to exert a downward bias force on the trailing arm, seed knife, and packer wheel;

a plurality of fertilizer assemblies each comprising a fertilizer disc rotatably mounted to the fertilizer assembly and operative to create a fertilizer furrow when engaged in the ground;

wherein the fertilizer discs and seed knives are movable from a transport position above the ground to a lowered operating position wherein the fertilizer discs and seed knives are engaged in the ground;

wherein the seed assemblies and fertilizer assemblies are oriented laterally on the implement frame such that in operation each fertilizer furrow is located between adjacent seed furrows; and wherein at least one trailing arm comprises a parallel linkage operative to maintain the knife and packer wheel at substantially constant vertical positions with respect to each other as the trailing arm moves up and down.

10. A method of seeding and fertilizing a field comprising:

providing an implement frame mounted on wheels for travel over the ground in an operating travel direction, the frame comprising at least front and rear lateral frame members;

attaching a plurality of seed assemblies to the implement frame, each seed assembly comprising:
  a trailing arm pivotally connected at a front end thereof to the frame about a substantially horizontal front arm axis oriented substantially perpendicular to the operating travel direction;
  a packer wheel rotatably attached to rear end of the trailing arm;
  a seed knife attached to the trailing arm ahead of the packer wheel and operative to create a seed furrow when a bottom end thereof is engaged in the ground, the knife oriented such that the packer wheel rolls substantially alone the seed furrow; and
  a bias device operative to exert a downward bias force on the trailing arm when the trailing arm is in the operating position;

adjusting a vertical position of the seed knife to a desired position with respect to the packer wheel;

mounting a plurality of fertilizer assemblies to the frame, each fertilizer assembly comprising a fertilizer disc rotatably mounted to the fertilizer assembly, the fertilizer disc operative to create a fertilizer furrow when engaged in the ground;

orienting the seed assemblies and fertilizer assemblies laterally on the implement frame such that in operation each fertilizer furrow is located between adjacent seed furrows;

moving the seed knives and fertilizer discs down from a transport position above the ground to a lowered operating position wherein the fertilizer discs and seed knives are engaged in the ground;

moving the implement frame across the field in the operating travel direction and depositing fertilizer into the fertilizer furrows and depositing seed into the seed furrows ahead of the packer wheel;

wherein the fertilizer discs are mounted to the front frame member such that same engage the ground along a front line substantially perpendicular to the operating travel direction;

wherein a first set of seed assemblies each has a trailing arm pivotally connected at a front end thereof to the front frame member such that a first set of seed knives operate along a middle line substantially perpendicular to the operating travel direction and a desired distance rearward of the front line; and wherein a second set of seed assemblies each has a trailing arm pivotally connected at a front end thereof to the rear frame member such that a second set of seed knives operate along a rear line substantially perpendicular to the operating travel direction and a desired distance rearward of the middle line.

11. A method of seeding and fertilizing a field comprising:

providing an implement frame mounted on wheels for travel over the ground in an operating travel direction, the frame comprising at least front, middle, and rear lateral frame members;

attaching a plurality of seed assemblies to the implement frame, each seed assembly comprising:
  a trailing arm pivotally connected at a front end thereof to the frame about a substantially horizontal front arm axis oriented substantially perpendicular to the operating travel direction;
  a packer wheel rotatably attached to rear end of the trailing arm;
  a seed knife attached to the trailing arm ahead of the packer wheel and operative to create a seed furrow when a bottom end thereof is engaged in the ground, the knife oriented such that the packer wheel rolls substantially alone the seed furrow; and
  a bias device operative to exert a downward bias force on the trailing arm when the trailing arm is in the operating position;

adjusting a vertical position of the seed knife to a desired position with respect to the packer wheel;

mounting a plurality of fertilizer assemblies to the frame, each fertilizer assembly comprising a fertilizer disc rotatably mounted to the fertilizer assembly, the fertilizer disc operative to create a fertilizer furrow when engaged in the ground;

orienting the seed assemblies and fertilizer assemblies laterally on the implement frame such that in operation each fertilizer furrow is located between adjacent seed furrows;

moving the seed knives and fertilizer discs down from a transport position above the ground to a lowered operating position wherein the fertilizer discs and seed knives are engaged in the ground;

moving the implement frame across the field in the operating travel direction and depositing fertilizer into the fertilizer furrows and depositing seed into the seed furrows ahead of the packer wheel;

wherein the fertilizer discs are mounted to the front frame member such that same engage the ground along a front line substantially perpendicular to the operating travel direction;

wherein a first set of seed assemblies each has a trailing arm pivotally connected at a front end thereof to the middle frame member such that a first set of seed knives operate along a middle line substantially perpendicular to the operating travel direction and a desired distance rearward of the front line; and wherein a second set of seed assemblies each has a trailing arm pivotally connected at a front end thereof to the rear frame member such that a second set of seed knives operate along a rear line substantially perpendicular to the operating travel direction and a desired distance rearward of the middle line.

12. A method of seeding and fertilizing a field comprising:

providing an implement frame mounted on wheels for travel over the ground in an operating travel direction, the frame comprising front and rear lateral frame members;

attaching a plurality of seed assemblies to the implement
   frame, each seed assembly comprising:
   a trailing arm pivotally connected at a front end thereof
      to the frame about a substantially horizontal front
      arm axis oriented substantially perpendicular to the
      operating travel direction;
   a packer wheel rotatably attached to rear end of the
      trailing arm;
   a seed knife attached to the trailing arm ahead of the
      packer wheel and operative to create a seed furrow
      when a bottom end thereof is engaged in the ground,
      the knife oriented such that the packer wheel rolls
      substantially along the seed furrow; and
   a bias device operative to exert a downward bias force
      on the trailing arm when the trailing arm is in the
      operating position;
adjusting a vertical position of the seed knife to a desired
   position with respect to the packer wheel;
mounting a plurality of fertilizer assemblies to the frame,
   each fertilizer assembly comprising a fertilizer disc
   rotatably mounted to the fertilizer assembly, the fertil-
   izer disc operative to create a fertilizer furrow when
   engaged in the ground;
orienting the seed assemblies and fertilizer assemblies
   laterally on the implement frame such that in operation
   each fertilizer furrow is located between adjacent seed
   furrows;
moving the seed knives and fertilizer discs down from a
   transport position above the ground to a lowered oper-
   ating position wherein the fertilizer discs and seed
   knives are engaged in the ground;
moving the implement frame across the field in the
   operating travel direction and depositing fertilizer into
   the fertilizer furrows and depositing seed into the seed
   furrows ahead of the packer wheel;
wherein the frame is mounted to the wheels such that a
   vertical position of the frame with respect to the wheels
   can be varied to move the fertilizer discs from the
   transport position down into the operating position; and
wherein at least one fertilizer disc is mounted on a bottom
   end of a substantially vertically oriented elongate mem-
   ber that is vertically adjustable with respect to the front
   frame member.

13. A method of seeding and fertilizing a field comprising:
providing an implement frame mounted on wheels for
   travel over the ground in an operating travel direction,
   the frame comprising front and rear lateral frame
   members;
attaching a plurality of seed assemblies to the implement
   frame, each seed assembly comprising:
   a trailing arm pivotally connected at a front end thereof
      to the frame about a substantially horizontal front
      arm axis oriented substantially perpendicular to the
      operating travel direction;
   a packer wheel rotatably attached to rear end of the
      trailing arm;
   a seed knife attached to the trailing arm ahead of the
      packer wheel and operative to create a seed furrow
      when a bottom end thereof is engaged in the ground,
      the knife oriented such that the packer wheel rolls
      substantially alone the seed furrow; and
   a bias device operative to exert a downward bias force
      on the trailing arm when the trailing arm is in the
      operating position;
adjusting a vertical position of the seed knife to a desired
   position with respect to the packer wheel;
mounting a plurality of fertilizer assemblies to the frame,
   each fertilizer assembly comprising a fertilizer disc
   rotatably mounted to the fertilizer assembly, the fertil-
   izer disc operative to create a fertilizer furrow when
   engaged in the ground;
orienting the seed assemblies and fertilizer assemblies
   laterally on the implement frame such that in operation
   each fertilizer furrow is located between adjacent seed
   furrows;
moving the seed knives and fertilizer discs down from a
   transport position above the ground to a lowered oper-
   ating position wherein the fertilizer discs and seed
   knives are engaged in the ground;
moving the implement frame across the field in the
   operating travel direction and depositing fertilizer into
   the fertilizer furrows and depositing seed into the seed
   furrows ahead of the packer wheel;
wherein the frame is mounted to the wheels such that a
   vertical position of the frame with respect to the wheels
   is substantially fixed when in a field working position
   and wherein at least one fertilizer assembly comprises
   a fertilizer disc actuator operative to move the fertilizer
   disc of the at least one fertilizer assembly with respect
   to the frame from the transport position to the operating
   position.

14. The method of claim 13 wherein the at least one
fertilizer assembly comprises a disc arm pivotally attached
at a first end thereof to the frame, and wherein the fertilizer
disc is rotatably attached to a rear end of the disc arm, and
wherein the fertilizer disc actuator is operative to move the
disc arm and attached fertilizer disc from the transport
position to the operating position.

15. The method of claim 13 wherein the seed knife is
pivotally attached to the trailing arm by a knife bracket, and
wherein the trailing arm actuator is attached to the knife
bracket.

16. The method of claim 13 wherein at least one bias
device comprises a hydraulic cylinder.

17. The method of claim 16 wherein the hydraulic cyl-
inder is connectable to an active hydraulic source operative,
when connected to a first port of the hydraulic cylinder, to
maintain a substantially constant pressure in the hydraulic
cylinder to exert a substantially constant downward bias
force on the trailing arm when the trailing arm is in the
operating position while allowing the hydraulic cylinder to
extend and retract in response to forces exerted on the
trailing arm, and operative, when connected to a second port
of the hydraulic cylinder, to raise the trailing arm to a
transport position.

18. A method of seeding and fertilizing a field comprising:
providing an implement frame mounted on wheels for
   travel over the ground in an operating travel direction,
   the frame comprising front and rear lateral frame
   members;
attaching a plurality of seed assemblies to the implement
   frame, each seed assembly comprising:
   a trailing arm pivotally connected at a front end thereof
      to the frame about a substantially horizontal front
      arm axis oriented substantially perpendicular to the
      operating travel direction;
   a packer wheel rotatably attached to rear end of the
      trailing arm;
   a seed knife attached to the trailing arm ahead of the
      packer wheel and operative to create a seed furrow
      when a bottom end thereof is engaged in the ground, the knife oriented such that the packer wheel rolls substantially along the seed furrow; and a bias device operative to exert a downward bias force on the trailing arm when the trailing arm is in the operating position;

adjusting a vertical position of the seed knife to a desired position with respect to the packer wheel;

mounting a plurality of fertilizer assemblies to the frame, each fertilizer assembly comprising a fertilizer disc rotatably mounted to the fertilizer assembly, the fertilizer disc operative to create a fertilizer furrow when engaged in the ground;

orienting the seed assemblies and fertilizer assemblies laterally on the implement frame such that in operation each fertilizer furrow is located between adjacent seed furrows;

moving the seed knives and fertilizer discs down from a transport position above the ground to a lowered operating position wherein the fertilizer discs and seed knives are engaged in the ground;

moving the implement frame across the field in the operating travel direction and depositing fertilizer into the fertilizer furrows and depositing seed into the seed furrows ahead of the packer wheel;

wherein at least one trailing arm comprises a parallel linkage operative to maintain the knife and packer wheel at substantially constant vertical positions with respect to each other as the trailing arm moves up and down.

* * * * *

UNITED STATES PATENT AND TRADEMARK OFFICE
CERTIFICATE OF CORRECTION

| | | |
|---|---|---|
| PATENT NO. | : 7,159,523 B2 | Page 1 of 1 |
| APPLICATION NO. | : 11/336183 | |
| DATED | : January 9, 2007 | |
| INVENTOR(S) | : Gerard Bourgault and Mark Cresswell | |

It is certified that error appears in the above-identified patent and that said Letters Patent is hereby corrected as shown below:

Column 13, claim 3, line 7 "around" should be changed to --ground--.

Column 15, claim 10, line 35 "alone" should be changed to --along--.

Column 16, claim 11, line 24 "alone" should be changed to --along--.

Column 17, claim 13, line 62 "alone" should be changed to --along--.

Signed and Sealed this

Sixth Day of January, 2009

JON W. DUDAS
*Director of the United States Patent and Trademark Office*